(12) United States Patent
Zhang et al.

(10) Patent No.: US 11,363,574 B2
(45) Date of Patent: Jun. 14, 2022

(54) INFORMATION TRANSMISSION METHOD, TERMINAL, AND NETWORK SIDE DEVICE

(71) Applicant: HUAWEI TECHNOLOGIES CO., LTD., Guangdong (CN)

(72) Inventors: Xingwei Zhang, Beijing (CN); Guanglong Du, Beijing (CN); Chao Li, Beijing (CN); Jie Shi, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/503,906

(22) Filed: Jul. 5, 2019

(65) Prior Publication Data

US 2019/0327728 A1   Oct. 24, 2019

Related U.S. Application Data

(63) Continuation of application No. PCT/CN2018/071544, filed on Jan. 5, 2018.

(30) Foreign Application Priority Data

Jan. 6, 2017  (CN) .................. 2017100113970.8

(51) Int. Cl.
*G01R 31/08* (2020.01)
*H04W 72/04* (2009.01)
(Continued)

(52) U.S. Cl.
CPC ....... *H04W 72/0413* (2013.01); *H04L 5/0048* (2013.01); *H04W 24/10* (2013.01)

(58) Field of Classification Search
None
See application file for complete search history.

(56) References Cited

U.S. PATENT DOCUMENTS 9,253,765 B2 *  2/2016  Nam ................... H04L 5/0055
10,164,699 B2 * 12/2018  Franz .................. H04B 17/364
(Continued)

FOREIGN PATENT DOCUMENTS

CN    101720533 A   6/2010
CN    102025463 A   4/2011
(Continued)

OTHER PUBLICATIONS

Intel Corporation, Scheduling request design for NR. 3GPP TSG-RAN WG1 #87 Reno, USA, Nov. 14-18, 2016, R1-1611998, 4 pages.
(Continued)

*Primary Examiner* — Gerald A Smarth
(74) *Attorney, Agent, or Firm* — Womble Bond Dickinson (US) LLP (57) ABSTRACT

An information transmission method, is provided, including, a terminal determines attribute information of uplink information based on a beam identifier, and sends the uplink information to a network side device based on the attribute information. After receiving the uplink information, the network side device determines the beam identifier based on the uplink information. In this process, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

20 Claims, 3 Drawing Sheets

(51) Int. Cl.
*H04L 5/00* (2006.01)
*H04W 24/10* (2009.01)

(56) References Cited

U.S. PATENT DOCUMENTS

| | | | |
|---|---|---|---|
| 10,849,155 B2* | 11/2020 | Gao | H04B 7/0626 |
| 2007/0191066 A1* | 8/2007 | Khojastepour | H04B 7/0486 |
| | | | 455/562.1 |
| 2009/0209264 A1 | 8/2009 | Yang et al. | |
| 2009/0274227 A1* | 11/2009 | Kim | H04B 7/0619 |
| | | | 375/260 |
| 2012/0230268 A1* | 9/2012 | Marinier | H04W 72/0413 |
| | | | 370/329 |
| 2014/0161085 A1 | 6/2014 | Kim et al. | |
| 2016/0219618 A1* | 7/2016 | Rico Alvarino | H04L 1/1671 |
| 2017/0026938 A1* | 1/2017 | Onggosanusi | H04B 7/0626 |
| 2017/0325260 A1* | 11/2017 | Guo | H04L 27/265 |
| 2018/0254863 A1* | 9/2018 | Choi | H04L 5/0073 |
| 2019/0229789 A1* | 7/2019 | Zhang | H04B 7/0695 |

FOREIGN PATENT DOCUMENTS

| | | |
|---|---|---|
| CN | 102291217 A | 12/2011 |
| CN | 102710376 A | 10/2012 |
| EP | 1562306 A1 | 8/2005 |

OTHER PUBLICATIONS

Huawei et al., Structure of 1-symbol PUCCH for more than 2bits. 3GPP TSG RAN WG1 Meeting #89 Hangzhou, China, May 15-19, 2017, R1-1706951, 4 pages.

Huawei et al, Long PUCCH for UCI of up to 2 bits. 3GPP TSG RAN WG1 Meeting AH_NR#3 Nagoya, Japan, Sep. 18-21, 2017, R1-1715402, 6 pages.

Xinwei:"Discussion of NR Initial Access", 3GPP Draft; R1-1609697, vol. RAN WG1, No. Lisbon, Portugal;Oct. 11, 2016-Oct. 14, 2016, Oct. 9, 2016, XP051149731, 7 pages.

CMCC: "RACH in Gradual UE-Specific (GUS) initial access", 3GPP Draft; R1-1612182, vol. RAN WG1, No. Reno, USA; Nov. 16, 2016-Nov. 14, 2016, Nov. 13, 2016, XP051176134, 5 pages.

Huawei, HiSilicon:"Discussion on DL 2-symbol sTTI structure", 3GPP TSG RAN WG1 Meeting #87, R1-1611154, Reno, USA Nov. 14-18, 2016. total 5 pages.

* cited by examiner

INFORMATION TRANSMISSION METHOD, TERMINAL, AND NETWORK SIDE DEVICE

CROSS-REFERENCE TO RELATED APPLICATIONS

This application is continuation of International Application No. PCT/CN2018/071544, filed on Jan. 5, 2018, which claims priority to Chinese Patent Application No. 201710011397.8, filed on Jan. 6, 2017. The disclosures of which are hereby incorporated by reference in their entireties.

TECHNICAL FIELD

Embodiments of this application relate to the field of communications technologies, and in particular, to an information transmission method, a terminal, and a network side device.

BACKGROUND

In a new radio access technology (NR) of the 5th generation mobile communication (5G), high frequencies are used for data transmission. There is a relatively large loss in high-frequency signal transmission. Therefore, during data transmission in 5G NR, beamforming is used to improve signal quality. Specifically, a terminal obtains a measurement result by measuring a beamforming reference signal (BRS) sent by a base station, and reports measurement results of beams to the base station, or reports a beam identifier (Beam ID) of a beam with an optimal measurement result to the base station.

Because no beam ID reporting mechanism is currently available in long term evolution (LTE), adding a new form of uplink control information (UCI), for example, a beamforming indication (BFI), is considered in order to implement beam ID reporting. UE carries the beam ID in the BFI and sends the BFI to the base station, to implement beam ID reporting.

In the beam ID reporting process, a new form of UCI, namely, a BFI, needs to be added, and a new physical uplink channel format needs to be defined for the BFI. As a result, the LTE standardization is more complex, and the new form of UCI inevitably increases signaling overheads.

SUMMARY

Embodiments disclosed herein provide an information transmission method, a terminal, and a network side device. A terminal implicitly indicates a beam ID to a base station, reducing LTE standardization complexity and reducing signaling overheads.

According to a first aspect, an embodiment provides an information transmission method, where the method is described from a perspective of a terminal. In this method, the terminal determines attribute information of uplink information based on a beam identifier, and sends the uplink information to a network side device based on the attribute information. After receiving the uplink information, the network side device determines the beam identifier based on the uplink information.

In the foregoing method, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

In a feasible design, the attribute information includes at least one of the following information: resource information used when the uplink information is sent, parameter information of the uplink information, a value of the uplink information, content information of the uplink information, and format information of the uplink information.

In the foregoing method, the attribute information of the uplink information includes various types of information, and the various types of information can be used to implicitly indicate beam IDs, so as to flexibly indicate beam IDs.

In one design, if the attribute information includes the resource information used when the uplink information is sent, the sending, by the terminal, the uplink information to a network side device based on the attribute information includes: sending, by the terminal, the uplink information to the network side device on a resource indicated by the resource information.

This implementation allows the terminal to implicitly indicate a beam ID by using the resource on which the uplink information is sent.

In one design, if the attribute information includes the parameter information of the uplink information, the sending, by the terminal, the uplink information to a network side device based on the attribute information includes: sending, by the terminal, the uplink information to the network side device based on a parameter indicated by the parameter information.

This implementation allows the terminal to implicitly indicate a beam ID by using the parameter of the uplink information.

In one design, if the attribute information includes the value of the uplink information, the sending, by the terminal, the uplink information to a network side device based on the attribute information includes: sending, by the terminal, uplink information corresponding to the value to the network side device.

This implementation allows the terminal to implicitly indicate a beam ID by using the value of the uplink information.

In one design, if the attribute information includes the content information of the uplink information, the sending, by the terminal, the uplink information to a network side device based on the attribute information includes: sending, by the terminal to the network side device, uplink information including content corresponding to the content information.

This implementation allows the terminal to implicitly indicate a beam ID by using the content of the uplink information.

In one design, if the attribute information includes the format information of the uplink information, the sending, by the terminal, the uplink information to a network side device based on the attribute information includes: sending, by the terminal, the uplink information to the network side device based on the format information.

This implementation allows the terminal to implicitly indicate a beam ID by using the format information of the uplink information.

In one design, the determining, by a terminal, attribute information of uplink information based on a beam identifier includes: determining, by the terminal based on a mapping relationship, attribute information of uplink information corresponding to the beam identifier, where the mapping relationship is configured by the network side device for the terminal; or the mapping relationship is obtained through table query; or the mapping relationship is pre-agreed.

According to a second aspect, an embodiment provides an information transmission method, where the method is described from a perspective of a network side device. In this method, the network side device receives uplink information sent by a terminal based on attribute information that is determined based on a beam identifier.

In the foregoing method, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

In one design, the attribute information includes at least one of the following information: resource information used when the uplink information is sent, parameter information of the uplink information, a value of the uplink information, content information of the uplink information, and format information of the uplink information.

In one design, if the attribute information includes the resource information used when the uplink information is sent, receiving, by the network side device, the uplink information sent by the terminal based on the attribute information includes: receiving, by the network side device, the uplink information sent by the terminal on a resource indicated by the resource information.

In one design, if the attribute information includes the parameter information of the uplink information, receiving, by the network side device, the uplink information sent by the terminal based on the attribute information includes: receiving, by the network side device, the uplink information sent by the terminal based on a parameter indicated by the parameter information.

In one design, if the attribute information includes the value of the uplink information, receiving, by the network side device, the uplink information sent by the terminal based on the attribute information includes: receiving, by the network side device, uplink information, sent by the terminal, that is corresponding to the value.

In one design, if the attribute information includes the content information of the uplink information, receiving, by the network side device, the uplink information sent by the terminal based on the attribute information includes: receiving, by the network side device, uplink information, sent by the terminal, that contains content corresponding to the content information.

In one design, if the attribute information includes the format information of the uplink information, receiving, by the network side device, the uplink information sent by the terminal based on the attribute information includes: receiving, by the network side device, the uplink information sent by the terminal based on the format information.

In one design, the attribute information is attribute information, of the uplink information corresponding to the beam identifier, that is determined by the terminal based on a mapping relationship, where the mapping relationship is configured by the network side device for the terminal; or the mapping relationship is obtained through table query; or the mapping relationship is pre-agreed.

According to a third aspect, an embodiment provides a terminal, including:
a processing module, configured to determine attribute information of uplink information based on a beam identifier, where the uplink information includes uplink control information or an uplink control channel; and
a transceiver module, configured to send the uplink information to a network side device based on the attribute information.

In one design, the attribute information includes at least one of the following information: resource information used when the uplink information is sent, parameter information of the uplink information, a value of the uplink information, content information of the uplink information, and format information of the uplink information.

In one design, if the attribute information includes the resource information used when the uplink information is sent, the transceiver module is specifically configured to send the uplink information to the network side device based on a resource indicated by the parameter information.

In one design, if the attribute information includes the parameter information of the uplink information, the transceiver module is specifically configured to send the uplink information to the network side device based on a parameter indicated by the parameter information.

In one design, if the attribute information includes the value of the uplink information, the transceiver module is specifically configured to send uplink information corresponding to the value to the network side device.

In one design, if the attribute information includes the content information of the uplink information, the transceiver module is specifically configured to send, to the network side device, uplink information including content corresponding to the content information.

In one design, if the attribute information includes the format information of the uplink information, the transceiver module is specifically configured to send the uplink information to the network side device based on the format information.

In one design, the processing module is specifically configured to determine, based on a mapping relationship, attribute information of uplink information corresponding to the beam identifier, where the mapping relationship is configured by the network side device for the terminal; or the mapping relationship is obtained through table query; or the mapping relationship is pre-agreed.

According to a fourth aspect, an embodiment provides a network side device, including:
a transceiver module, configured to receive uplink information sent by a terminal based on attribute information, where the attribute information is determined by the terminal based on a beam identifier, and the uplink information includes uplink control information or an uplink control channel; and
a processing module, configured to determine the beam identifier based on the uplink information.

In one design, the attribute information includes at least one of the following information: resource information used when the uplink information is sent, parameter information of the uplink information, a value of the uplink information, content information of the uplink information, and format information of the uplink information.

In one design, if the attribute information includes the resource information used when the uplink information is sent, the transceiver module is specifically configured to receive the uplink information sent by the terminal on a resource indicated by the resource information.

In one design, if the attribute information includes the parameter information of the uplink information, the transceiver module is specifically configured to receive the uplink information sent by the terminal based on a parameter indicated by the parameter information.

In one design, if the attribute information includes the value of the uplink information, the transceiver module is specifically configured to receive uplink information, sent by the terminal, that is corresponding to the value.

In one design, if the attribute information includes the content information of the uplink information, the transceiver module is specifically configured to receive uplink information, sent by the terminal, that contains content corresponding to the content information.

In one design, if the attribute information includes the format information of the uplink information, the transceiver module is specifically configured to receive the uplink information sent by the terminal based on the format information.

In one design, the attribute information is attribute information, of the uplink information corresponding to the beam identifier, that is determined by the terminal based on a mapping relationship, where the mapping relationship is configured by the network side device for the terminal; or the mapping relationship is obtained through table query; or the mapping relationship is pre-agreed.

According to a fifth aspect, an embodiment provides a terminal, including a processor, a memory, a communications interface, and a system bus, where the memory and the communications interface are connected to and communicate with the processor by using the system bus; the memory is configured to store a computer-executable instruction; the communications interface is configured to communicate with another device; and the processor is configured to run the computer-executable instruction, so that the terminal can perform steps of the foregoing method applied to a terminal.

According to a sixth aspect, an embodiment provides a network side device, including a processor, a memory, a communications interface, and a system bus, where the memory and the communications interface are connected to and communicate with the processor by using the system bus; the memory is configured to store a computer-executable instruction; the communications interface is configured to communicate with another device; and the processor is configured to run the computer-executable instruction, so that the network side device can perform steps of the foregoing method applied to a network side device.

According to a seventh aspect, an embodiment provides a computer storage medium, configured to store a computer software instruction used by the foregoing terminal, where the computer storage medium includes a program designed for performing the first aspect or the feasible implementations of the first aspect.

According to an eighth aspect, an embodiment provides a computer storage medium, configured to store a computer software instruction used by the foregoing network side device, where the computer storage medium includes a program designed for performing the second aspect or the feasible implementations of the second aspect.

According to a ninth aspect, an embodiment provides a chip system, including at least one processor, a memory, an input/output part, and a bus, where the at least one processor obtains an instruction from the memory through the bus, to implement a design function of the terminal in the foregoing method.

According to a tenth aspect, an embodiment provides a chip system, including at least one processor, a memory, an input/output part, and a bus, where the at least one processor obtains an instruction from the memory through the bus, to implement a design function of the network side device in the foregoing method.

According to an eleventh aspect, an embodiment provides a terminal, including a memory and a processor, where the memory is configured to store a program instruction, and the processor is configured to invoke the program instruction in the memory, to implement a function of the terminal in the foregoing method embodiments.

According to a twelfth aspect, an embodiment provides a network side device, including a memory and a processor, where the memory is configured to store a program instruction, and the processor is configured to invoke the program instruction in the memory, to implement a function of the network side device in the foregoing method embodiments.

According to the information transmission method, the terminal, and the network side device that are provided in the embodiments of this application, the terminal determines the attribute information of the uplink information based on the beam identifier, and sends the uplink information to the network side device based on the attribute information. After receiving the uplink information, the network side device determines the beam identifier based on the uplink information. In this process, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

DESCRIPTION OF EMBODIMENTS

5G NR defines a new air interface access technology to support a user-experienced data rate from 0.1 Gbps to 1 Gbps, a connection density of one million connections per square kilometer, an end-to-end millisecond-level latency, a traffic density of dozens of Tbps per square kilometer, mobility of over 500 km per hour, and a peak rate of dozens of Gbps. The user-experienced data rate, the connection density, and the latency are three most basic performance indicators for 5G. In addition, efficiency of network deployment and operation needs to be greatly improved in 5G Compared with 4G in 5G frequency efficiency will be increased by 5 times to 15 times, and energy efficiency and cost efficiency will be increased by more than 100 times. Three application scenarios and requirements of 5G include: enhanced mobile broadband (eMBB), massive machine type communications (mMTC) and ultra-reliable and low latency communications (URLLC). Scenarios corresponding to URLLC applications include unmanned driving, industrial control, and the like, and require low latency and high reliability. Specific requirements of low latency are an end-to-end latency of 0.5 ms, and a round trip latency of 1 ms in air-interface information exchange. A specific requirement of high reliability is that a block error rate (BLER) reaches $10^{-5}$. In other words, a proportion of correctly received data packets reaches 99.999%.

Because data is transmitted by using a high frequency in 5G severe signal fading occurs and there is a small coverage area. To resolve this problem, beamforming application and beam management are strengthened in 5G NR. Herein, a new form of UCI is introduced. The new form of UCI is, for example, a beamforming indication (BFI). UE carries a beam ID in the BFI and sends the BFI to a base station, so as to implement beam ID reporting. In a reporting process, a terminal (User Equipment, UE) measures a BRS, of each beam, that is sent by a base station, and reports, to the based station by using a BFI, a measurement result of each beam or a beam ID of a beam with a best measurement result. The BFI may appear on a physical uplink control channel (PUCCH), or may appear on a physical uplink shared channel (PUSCH). Alternatively, the BFI may be carried by a separate channel. For example, a new physical beamforming channel (PBFCH) is defined, and the BFI is carried on the PBFCH.

In this beam ID reporting process, a new form of UCI, namely, a BFI, needs to be added, and a new physical uplink channel format needs to be defined for the BFI. As a result, the LTE standardization is more complex, and the new form of UCI inevitably increases signaling overheads.

In view of this, the disclosed embodiments provide an information transmission method, a terminal, and a network side device, so that a terminal implicitly indicates a beam ID to a base station, reducing LTE standardization complexity and reducing signaling overheads.

Technologies described in this specification may be applied to various communications systems with multiple types of terminals, for example, a global system for mobile communications (GSM), a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, an E-UTRA system, a 5G mobile communications system, and another communications system.

The network side device in the disclosed embodiments may be a base station, an access point (AP), or the like. The base station may be a device that communicates with a wireless terminal over an air interface in an access network by using one or more sectors. The base station may be configured to mutually convert a received over-the-air frame and an IP packet and serve as a router between the wireless terminal and a rest portion of the access network, where the rest portion of the access network may include an Internet protocol (IP) network. The base station may further coordinate attribute management of the air interface. For example, the base station may be a base transceiver station (BTS) in GSM or CDMA, may be a NodeB (NodeB) in WCDMA, or may be an evolved NodeB (eNB, or e-NodeB) in LTE, or a 5G base station. This is not so limited in the disclosed embodiments.

The terminal in the disclosed embodiments may be a wired terminal or a wireless terminal. The wireless terminal may be a device that provides a user with voice and/or data connectivity, a handheld device with a wireless connection function, or another processing device connected to a wireless modem. The wireless terminal may communicate with one or more core networks through a radio access network (such as RAN, Radio Access Network, 5G RAN, or non-3GPP RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console (Mobile), a remote station, a remote terminal, an access terminal, a user terminal, a user agent, a user device, or user equipment.

Figure 1:
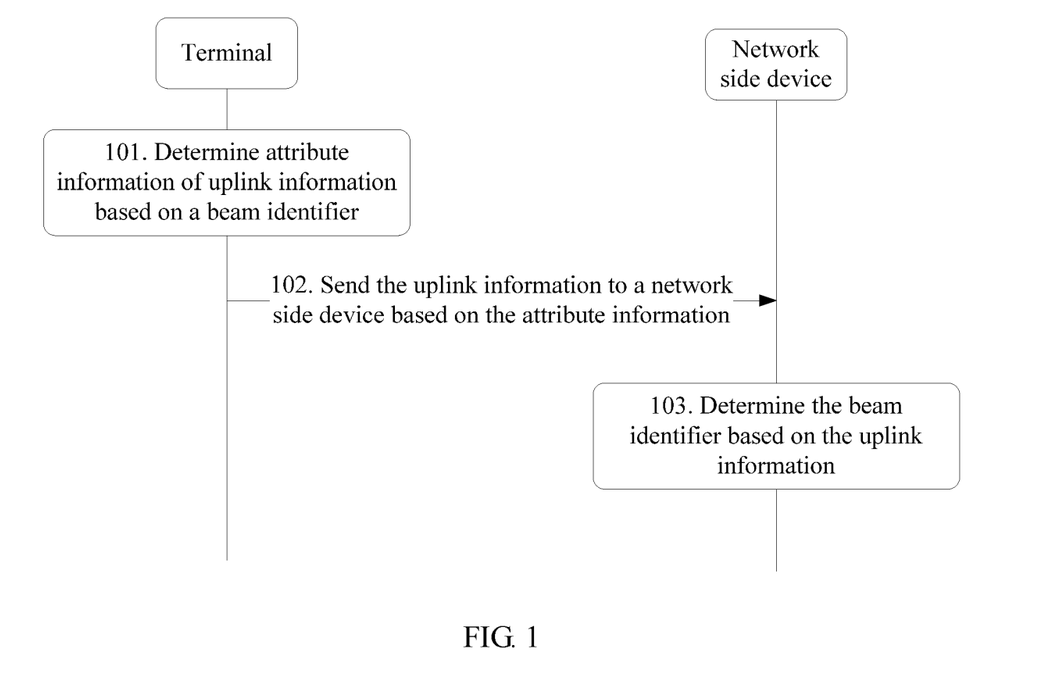
FIG. 1 is a signaling diagram of Embodiment 1 of an information transmission method according to one embodiment.

FIG. 1 is a signaling diagram of Embodiment 1 of an information transmission method according to one embodiment. This embodiment is described from a perspective of interaction between a terminal and a network side device, and this embodiment includes the following steps.

101. The terminal determines attribute information of uplink information based on a beam identifier.

In a 5G communication process, the terminal inevitably needs to send uplink control information (UCI) to the network side device through an uplink control channel. The uplink control channel is, for example, a physical uplink control channel (PUCCH). Uplink control channels may occupy different resources, include different parameters, and have different values, content, formats, or the like. In this embodiment of this application, a resource occupied by an uplink control channel, a parameter included in the uplink control channel, and a value, content, a format, or the like of the uplink control channel are referred to as attribute information of the uplink control channel.

The UCI is information fed back by the terminal to the network side device, for example, channel state information (CSI) obtained by the terminal through channel estimation. UCI may occupy different resources, include different parameters, and have different values, content, formats, or the like. In this embodiment of this application, a resource occupied by UCI, a parameter included in the UCI, and a value, content, a format, or the like of the UCI are referred to as attribute information of the UCI.

Usually, the terminal sends UCI to the network side device through an uplink control channel, and at least one piece of UCI is carried on one uplink control channel. Therefore, attribute information of the uplink control channel includes attribute information of the uplink control information.

For clarity, an uplink control channel and uplink control information (UCI) are collectively referred to as uplink information below. Unless otherwise specified, attribute information is generally attribute information of an uplink control channel or attribute information of uplink control information.

Based on the foregoing description, in this embodiment of this application, the terminal implicitly indicates beam IDs of selected beams by using attribute information of uplink information. Different beams correspond to different attribute information. The terminal determines, based on a mapping relationship, attribute information that is of uplink information and corresponds to the beam identifier, where the mapping relationship is configured by a base station for the terminal; or the mapping relationship is obtained through table query; or the mapping relationship is pre-agreed. The mapping relationship may be a one-to-one correspondence, or may be a one-to-many or many-to-one correspondence. For example, a beam 1 corresponds to a first resource group, and a beam 2 corresponds to a second resource group, if the terminal only needs to report uplink information on any one or more resources in the first resource group, it indicates that the terminal selects the beam 1, if the terminal reports uplink information on any one or more resources in the second resource group, it indicates that the terminal selects the beam 2. For another example, a beam 3, a beam 4, and a beam 5 correspond to a third resource group, if the terminal reports uplink information on the third resource group, it indicates that the terminal selects the beam 3, the beam 4, and the beam 5.

In this step, the network side device sends a BRS of each beam to the terminal, and the terminal measures BRSs of these beams to obtain a measurement result of each beam. The terminal then selects at least one beam from a plurality of beams based on the measurement results. For example, the terminal selects a beam with a best measurement result. For another example, the terminal selects three beams corresponding to the top three measurement results. After selecting a beam, the terminal determines attribute information of uplink information based on a beam identifier (beam ID) of the selected beam through table query or the like.

102. The terminal sends the uplink information to the network side device based on the attribute information.

103. The network side device determines the beam identifier based on the uplink information.

In this embodiment, each beam corresponds to specific attribute information such as a resource occupied by uplink information, a parameter included in the uplink information, and a value, content, or a format of the uplink information. Therefore, in steps 102 and 103, the terminal sends the uplink information to the network side device based on the attribute information corresponding to the selected beam, so that the network side device determines, based on the attribute information of the uplink information, the beam selected by the terminal.

In this embodiment, the terminal determines the attribute information of the uplink information based on the beam identifier, and sends the uplink information to the network side device based on the attribute information. After receiving the uplink information, the network side device determines the beam identifier based on the uplink information. In this process, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

Optionally, in the foregoing embodiment, the attribute information includes at least one of the following information: resource information used when the uplink information is sent, parameter information of the uplink information, a value of the uplink information, content information of the uplink information, and format information of the uplink information.

Specifically, the attribute information of the uplink information includes various types of information, and the various types of information can be used to implicitly indicate beam IDs. For example, an attribute information indication includes resource information used when uplink information is sent and parameter information of the uplink information. If attribute information of two pieces of uplink information indicates that the two pieces of uplink information occupy a same resource but includes different parameter information, the attribute information of the two pieces of uplink information corresponds to two different beam IDs.

In the foregoing method, the attribute information of the uplink information includes various types of information, and the various types of information can be used to implicitly indicate beam IDs, so as to flexibly indicate beam IDs.

The foregoing information transmission method is described below in detail by using several specific embodiments.

In an embodiment, the attribute information includes the resource information used when the uplink information is sent. In this case, the sending, by the terminal, the uplink information to the network side device based on the attribute information includes: sending, by the terminal, the uplink information to the network side device on a resource indicated by the resource information. Correspondingly, that the network side device receives the uplink information sent by the terminal based on the attribute information includes: receiving, by the network side device, the uplink information sent by the terminal on the resource indicated by the resource information.

In this implementation, the attribute information includes the resource information used when the uplink information is sent by the terminal, for example, resources such as a time domain resource, a frequency domain resource, a space domain resource, a code domain resource, a power domain resource, and a subcarrier spacing. The terminal has a plurality of resources for sending uplink information, and sending uplink information on different resources indicates that different beams are selected. For example, a plurality of candidate beams include only a beam 1 and a beam 2. If the terminal sends uplink information on a resource 1, it indicates that the terminal selects the beam 1; if the terminal sends uplink information on a resource 2, it indicates that the terminal selects the beam 2. For another example, the terminal has a resource pool for sending uplink information. In the resource pool, the terminal selects a resource for sending uplink information. The selected resource is related to a beam. For example, if selecting a beam 1, the terminal sends uplink information on an odd-numbered resource; if selecting a beam 2, the terminal sends uplink information on an even-numbered resource. In a sending process, the terminal calculates a resource number based on a beam number, while the network side device receives the uplink information, determines a number of a resource that is used for receiving the uplink information, and then performs a modulo operation or another calculation on a total quantity of beams based on the resource number, to obtain a beam number, namely, a beam ID.

In the foregoing method, the attribute information includes the resource information used when the uplink information is sent by the terminal. When the resource information specifically includes subcarrier spacing information, a beam ID can be implicitly indicated by the subcarrier spacing information. Specifically, a plurality of subcarrier spacings are introduced in 5G NR. A baseline is 15 kHz, and the plurality of subcarrier spacings may be 15 kHz×$2^n$, where n is an integer. There are a maximum of eight subcarrier spacings including 3.75 kHz, 7.5 kHz, . . . , and 480 kHz. Different subcarrier spacings correspond to different symbol lengths, subframe lengths, or the like. In this case, the attribute information includes the subcarrier spacing information used when the uplink information is sent, that is, a subcarrier spacing used for sending the uplink information, or information such as a subcarrier width, a symbol length, a slot length, and a quantity of symbols in a slot that are caused due to different subcarrier spacings. For example, candidate beams include a beam 1 and a beam 2. If the terminal sends uplink information by using a symbol whose length is less than or equal to a threshold, that is, sends the uplink information by using a short symbol, it indicates that the terminal selects the beam 1; if the terminal sends uplink information by using a symbol whose length is greater than the threshold, that is, sends the uplink information by using a long symbol, it indicates that the terminal selects the beam 2.

Further, when the uplink information is specifically UCI, a resource for the UCI may include a PUCCH or PUSCH resource that carries the UCI, for example, PUCCH resources of different formats, types, or bandwidths. PUCCH formats include format1, format1a, format2, format2a, format2b, format3, format4, or format5, and PUCCH types include long PUCCH, short PUCCH, and the like. In this case, a beam ID can be implicitly indicated by a format, a type, or a bandwidth. For example, candidate beams include a beam 1 and a beam 2. If the terminal sends UCI on a long PUCCH, it indicates that the terminal selects the beam 1; if the terminal sends UCI on a short PUCCH, it indicates that the terminal selects the beam 2. The UCI is, for example, channel state information (CSI). For another example, candidate beams include a beam 1 and a beam 2. If the terminal sends UCI on a PUSCH, it indicates that the terminal selects the beam 1; if the terminal sends UCI on a PUCCH, it indicates that the terminal selects the beam 2.

This implementation allows the terminal to implicitly indicate a beam ID by using the resource on which the uplink information is sent.

In another example, if the attribute information includes the parameter information of the uplink information, the sending, by the terminal, the uplink information to the network side device based on the attribute information includes: sending, by the terminal, the uplink information to the network side device based on a parameter indicated by the parameter information. Correspondingly, that the network side device receives the uplink information sent by the terminal based on the attribute information includes: receiving, by the network side device, the uplink information sent by the terminal based on the parameter indicated by the parameter information.

In this implementation, the attribute information includes the parameter information of the uplink information from the terminal, for example, transmit power, coding information, a period, an offset, timing, a subband, a modulation and coding scheme (MCS), a redundancy version (RV), frequency-domain frequency hopping, a carrier type, a resource allocation type, and the like. The transmit power includes open loop power, path loss compensation, a closed-loop power adjustment value, and the like. The coding information includes a cyclic shift, an orthogonal cover code, a root sequence, and the like. The frequency-domain frequency hopping includes whether frequency hopping occurs; a location in frequency domain after frequency hopping occurs; or the like. For example, candidate beams include a beam 1 and a beam 2. If the terminal sends an RV1, it indicates that the terminal selects the beam 1; if the terminal sends an RV2, it indicates that the terminal selects the beam 2.

This implementation allows the terminal to implicitly indicate a beam ID by using the parameter of the uplink information.

In still another example, if the attribute information includes the value of the uplink information, the sending, by the terminal, the uplink information to the network side device based on the attribute information includes: sending, by the terminal, uplink information corresponding to the value to the network side device. Correspondingly, that the network side device receives the uplink information sent by the terminal based on the attribute information includes: receiving, by the network side device, the uplink information, sent by the terminal, that is corresponding to the value.

Generally, the uplink information such as a channel quality indication (CQI) and an MCS has different values; therefore, a beam ID can be implicitly indicated by the uplink information. In this case, the attribute information includes a value of the uplink information. An example in which the foregoing uplink information is specifically CQI is used. The CQI has 16 values: 0 to 15, and the range is divided into two subsets. For example, candidate beams include a beam 1 and a beam 2. If a value of CQI sent by the terminal falls within 0 to 7, it indicates that the terminal selects the beam 1; if a value of CQI sent by the terminal falls within 8 to 15, it indicates that the terminal selects the beam 2. For another example, candidate beams include a beam 1 and a beam 2. If CQI sent by the terminal is an odd number, it indicates that the terminal selects the beam 1; if CQI sent by the terminal is an even number, it indicates that the terminal selects the beam 2. If the CQI actually measured by the terminal after the terminal selects the beam 2 is 9.5, it draws close to a nearest even number 10, and it is considered as that the value of the CQI is 10. The CQI is sent to the network side device. In this case, the network side device determines, based on the value of the CQI, that the terminal selects the beam 2.

This implementation allows the terminal to implicitly indicate a beam ID by using the value of the uplink information.

In still another example, if the attribute information includes the content information of the uplink information, the sending, by the terminal, the uplink information to the network side device based on the attribute information includes: sending, by the terminal, uplink information including content corresponding to the content information to the network side device. Correspondingly, that the network side device receives the uplink information sent by the terminal based on the attribute information includes: receiving, by the network side device, the uplink information, sent by the terminal, that contains the content corresponding to the content information.

In this implementation, the attribute information includes the content information of the uplink information, for example, a type of the uplink information sent by the terminal, a combination of different types, a type, or a mode. The type of the uplink information includes a scheduling request (SR), an positive acknowledgement (ACK), a negative acknowledgement (NACK), a CQI, a precoding matrix indicator (PMI), a rank indication (RI), a precoding type indicator (PTI), and the like. Different uplink information has different types or modes. An example in which the uplink information is specifically CSI is used as an example. The CSI includes but is not limited to ten types specified in a protocol. A CSI mode includes periodic CSI and aperiodic CSI. The periodic CSI includes six modes, and the aperiodic CSI includes five modes. Therefore, beam IDs can be implicitly indicated by uplink information that includes different content. For example, candidate beams include a beam 1 and a beam 2. If the terminal sends CSI by using a Type5, it indicates that the terminal selects the beam 1; if the terminal sends CSI by using a Type6, it indicates that the terminal selects the beam 2.

This implementation allows the terminal to implicitly indicate a beam ID by using the content of the uplink information.

In still another example, if the attribute information includes the format information of the uplink information, the sending, by the terminal, the uplink information to the network side device based on the attribute information includes: sending, by the terminal, the uplink information to the network side device based on the format information. Correspondingly, that the network side device receives the uplink information sent by the terminal based on the attribute information includes: receiving, by the network side device, the uplink information sent by the terminal based on the format information.

In this implementation, the attribute information includes the format information of the uplink information, where the format information indicates a quantity of bits of the uplink information, a symbol location occupied by the uplink information in one subframe, a quantity of occupied symbols, and the like. Different format information indicates different beam IDs. For example, a plurality of candidate beams include only a beam 1 and a beam 2. If uplink information sent by the terminal includes two bits, it indicates that the terminal selects the beam 1; if uplink information sent by the terminal includes three bits, it indicates that the terminal selects the beam 2. For another example, one subframe includes 14 symbols, and the last 12 of the 14 symbols each can be used for uplink information transmission, if uplink information occupies the first six symbols of the 12 symbols, it indicates that the terminal selects the beam 1, if uplink information occupies the last six symbols of the 12 symbols, it indicates that the terminal selects the beam 2.

This implementation allows the terminal to implicitly indicate a beam ID by using the format information of the uplink information.

Figure 2:
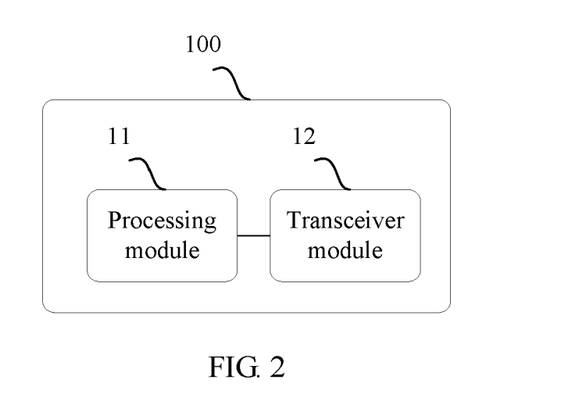
FIG. 2 is a schematic structural diagram of Embodiment 1 of a terminal according to one embodiment.

FIG. 2 is a schematic structural diagram of Embodiment 1 of a terminal according to one embodiment. The terminal provided in this embodiment can implement the steps of the method that is applied to a terminal and that is provided in any one of the embodiments of this application. Specifically, the terminal 100 provided in this embodiment includes:

a processing module 11, configured to determine attribute information of uplink information based on a beam identifier, where the uplink information includes uplink control information or an uplink control channel; and a transceiver module 12, configured to send the uplink information to a network side device based on the attribute information.

The terminal provided in this embodiment determines the attribute information of the uplink information based on the beam identifier, and sends the uplink information to the network side device based on the attribute information. After receiving the uplink information, the network side device determines the beam identifier based on the uplink information. In this process, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

Optionally, in one embodiment, the attribute information includes at least one of the following information: resource information used when the uplink information is sent, parameter information of the uplink information, a value of the uplink information, content information of the uplink information, and format information of the uplink information.

Optionally, in one embodiment, if the attribute information includes the resource information used when the uplink information is sent, the transceiver module 12 is specifically configured to send the uplink information to the network side device based on a resource indicated by the parameter information.

Optionally, in one embodiment, if the attribute information includes the parameter information of the uplink information, the transceiver module 12 is specifically configured to send the uplink information to the network side device based on a parameter indicated by the parameter information.

Optionally, in one embodiment, if the attribute information includes the value of the uplink information, the transceiver module 12 is specifically configured to send uplink information corresponding to the value to the network side device.

Optionally, in one embodiment, if the attribute information includes the content information of the uplink information, the transceiver module 12 is specifically configured to send, to the network side device, uplink information including content corresponding to the content information.

Optionally, in one embodiment, if the attribute information includes the format information of the uplink information, the transceiver module 12 is specifically configured to send the uplink information to the network side device based on the format information.

Optionally, in one embodiment, the processing module 11 is specifically configured to determine, based on a mapping relationship, attribute information of uplink information corresponding to the beam identifier, where the mapping relationship is configured by the network side device for the terminal; or the mapping relationship is obtained through table query; or the mapping relationship is pre-agreed.

Figure 3:
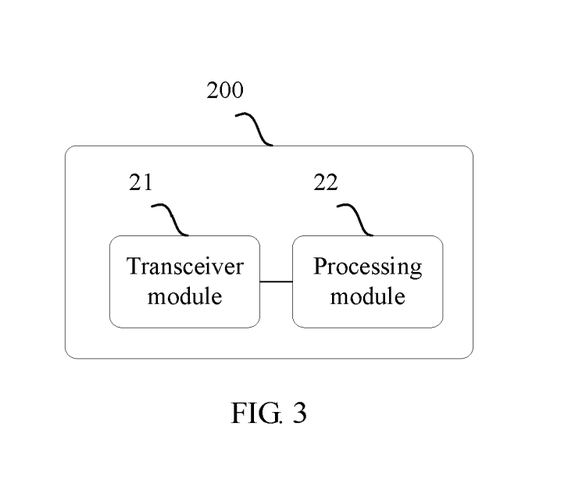
FIG. 3 is a schematic structural diagram of Embodiment 1 of a network side device according to one embodiment.

FIG. 3 is a schematic structural diagram of Embodiment 1 of a network side device according to one embodiment. The network side device provided in this embodiment can implement the steps of the method that is applied to a network side device and that is provided in any one of the embodiments of this application. Specifically, the network side device 200 provided in this embodiment includes:

a transceiver module 21, configured to receive uplink information sent by a terminal based on attribute information, where the attribute information is determined by the terminal based on a beam identifier, and the uplink information includes uplink control information or an uplink control channel; and a processing module 22, configured to determine the beam identifier based on the uplink information. The network side device provided in this embodiment of this application receives the uplink information determined by the terminal based on the beam identifier, and determines the beam identifier based on the uplink information. In this process, the terminal implicitly indicates beam IDs of different selected beams by using attribute information of reported uplink information. Different beams correspond to different attribute information of the uplink information. In other words, each beam corresponds to specific attribute information of the uplink information. Implicitly indicating a beam ID to the network side device reduces LTE standardization complexity and reduces signaling overheads.

Optionally, in one embodiment, the attribute information includes at least one of the following information: resource information used when the uplink information is sent, parameter information of the uplink information, a value of the uplink information, content information of the uplink information, and format information of the uplink information.

Optionally, in one embodiment, if the attribute information includes the resource information used when the uplink information is sent, the transceiver module 21 is specifically configured to receive the uplink information sent by the terminal on a resource indicated by the resource information.

Optionally, in one embodiment, if the attribute information includes the parameter information of the uplink information, the transceiver module 21 is specifically configured to receive the uplink information sent by the terminal based on a parameter indicated by the parameter information.

Optionally, in one embodiment, if the attribute information includes the value of the uplink information, the transceiver module 21 is specifically configured to receive uplink information, sent by the terminal, that is corresponding to the value.

Optionally, in one embodiment, if the attribute information includes the content information of the uplink information, the transceiver module 21 is specifically configured to receive uplink information, sent by the terminal, that contains content corresponding to the content information.

Optionally, in one embodiment, if the attribute information includes the format information of the uplink information, the transceiver module 21 is specifically configured to receive the uplink information sent by the terminal based on the format information.

Optionally, in one embodiment, the attribute information is attribute information, of the uplink information corresponding to the beam identifier, that is determined by the terminal based on a mapping relationship, where the mapping relationship is configured by the network side device for the terminal; or the mapping relationship is obtained through table query; or the mapping relationship is pre-agreed.

Figure 4:
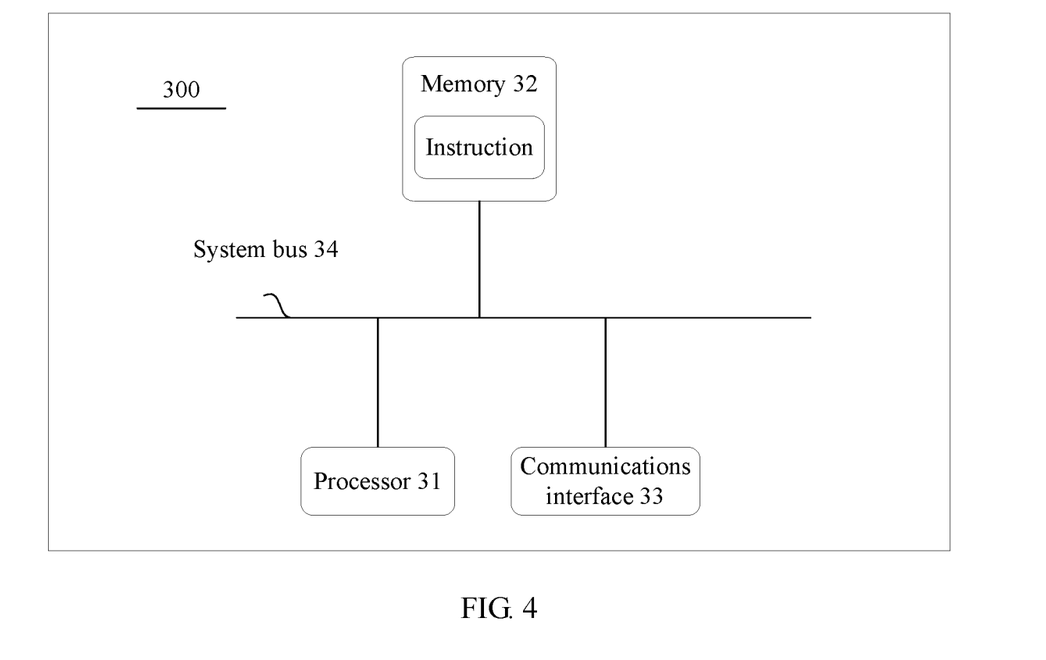
FIG. 4 is a schematic structural diagram of Embodiment 2 of a terminal according to one embodiment.

FIG. 4 is a schematic structural diagram of Embodiment 2 of a terminal according to one embodiment. The terminal 300 provided in this embodiment includes a processor 31, a memory 32, a communications interface 33, and a system bus 34. The memory 32 and the communications interface 33 are connected to and communicate with the processor 31 by using the system bus 34. The memory 32 is configured to store a computer-executable instruction. The communications interface 33 is configured to communicate with another device. The processor 31 is configured to run the computer-executable instruction, so that the terminal performs the steps of the foregoing method applied to a terminal.

Figure 5:
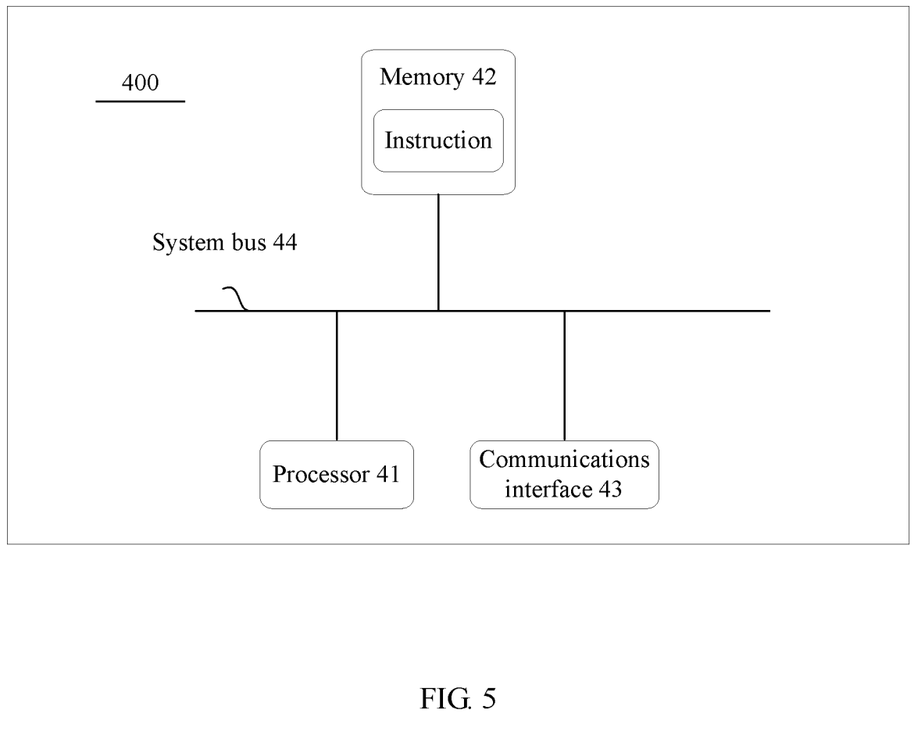
FIG. 5 is a schematic structural diagram of Embodiment 2 of a network side device according to one embodiment.

FIG. 5 is a schematic structural diagram of Embodiment 2 of a network side device according to one embodiment. The network side device 400 provided in this embodiment includes a processor 41, a memory 42, a communications interface 43, and a system bus 44. The memory 42 and the communications interface 43 are connected to and communicate with the processor 41 by using the system bus 44. The memory 42 is configured to store a computer-executable instruction. The communications interface 43 is configured to communicate with another device. The processor 41 is configured to run the computer-executable instruction, so that the network side device performs the steps of the foregoing method applied to a network side device.

The system bus mentioned in FIG. 4 and FIG. 5 may be a peripheral component interconnect (PCI) bus, an extended industry standard architecture (EISA) bus, or the like. The system bus may be classified into an address bus, a data bus, a control bus, and the like. For ease of representation, only one thick line is used to represent the bus in the figure, but this does not mean that there is only one bus or only one type of bus. The communications interface is configured to implement communication between a database access apparatus and another device (such as a client, a read/write database, or a read-only database). The memory may include a random access memory (RAM), or may further include a non-transitory memory, for example, at least one magnetic disk memory.

The processor may be a general-purpose processor, including a central processing unit (CPU), a network processor (NP), and the like; or may be a digital signal processor (DSP), an application-specific integrated circuit (ASIC), a field-programmable gate array (FPGA), or another programmable logic device, a discrete gate or a transistor logic device, or a discrete hardware component.

All or some of the steps of the method embodiments may be implemented by a program instructing relevant hardware. The program may be stored in a computer-readable storage medium. When the program is executed, the steps of the method embodiments are performed. The foregoing storage medium includes: any medium that can store program code, such as a ROM, a RAM, a magnetic disk, or an optical disc.

What is claimed is:

1. An information transmission method, comprising:
    determining attribute information of uplink information based on a beam identifier, wherein the uplink information comprises uplink control information, uplink control channel information, and the attribute information comprises content information included in the uplink information, wherein the uplink control information includes Channel State Information (C SI);
    implicitly indicating the beam identifier based on the attribute information of the uplink information; and
    sending the uplink information to a network side device based on the attribute information.

2. The method according to claim 1, wherein the method further comprising:
    obtaining at least one measurement result by measuring at least one beamforming reference signal (BRS), wherein each of the at least one measurement result corresponds to at least one BRS.

3. The method according to claim 2, wherein the method further comprising:
    selecting a beam with a best measurement result from the at least one measurement result; and
    reporting a beam identifier of the beam with the best measurement result.

4. The method according to claim 1, wherein the attribute information further comprises at least one of a value included in the uplink information, resource information used when uplink information is sent, parameter information included in the uplink information, or format information included in the uplink information.

5. The method according to claim 1, wherein the determining attribute information included in the uplink information based on a beam identifier comprises:
    determining, based on a mapping relationship, the attribute information included in the uplink information corresponding to the beam identifier, wherein the mapping relationship is configured by the network side device for a terminal, or the mapping relationship is obtained through a table query, or the mapping relationship is pre-agreed.

6. An information receiving method, comprising:
receiving uplink information from a terminal based on attribute information, wherein the attribute information is determined by the terminal based on a beam identifier, the uplink information comprises uplink control information, uplink control channel information, the attribute information comprises content information included in the uplink information, and the attribute information implicitly indicates the beam identifier, wherein the uplink control information includes Channel State Information (C SI); and
determining the beam identifier based on the uplink information.

7. The method according to claim 6, wherein receiving the uplink information from the terminal based on the attribute information comprises:
receiving a beam identifier of a beam with a best measurement result.

8. The method according to claim 6, wherein the attribute information further comprises at least one of a value of the uplink information, resource information used when uplink information is sent, parameter information included in the uplink information, or format information included in the uplink information.

9. The method according to claim 8, wherein receiving uplink information sent by the terminal based on attribute information comprises:
receiving the uplink information sent by the terminal based on a parameter indicated by the parameter information.

10. The method according to claim 6, wherein
the attribute information is attribute information included in the uplink information corresponding to the beam identifier that is determined by the terminal based on a mapping relationship, wherein the mapping relationship is configured by a network side device for the terminal, or the mapping relationship is obtained through a table query, or the mapping relationship is pre-agreed.

11. The apparatus according to claim 6, wherein the attribute information is attribute information included in the uplink information corresponding to the beam identifier that is determined by the terminal based on a mapping relationship, wherein the mapping relationship is configured by a network side device for the terminal, or the mapping relationship is obtained through a table query, or the mapping relationship is pre-agreed.

12. A terminal, comprising:
at least one processor configured to:
determine attribute information included in uplink information based on a beam identifier, wherein the uplink information comprises uplink control information, uplink control channel information, and the attribute information comprises content information included in the uplink information, wherein the uplink control information includes Channel State Information (CSI); and
implicitly indicating the beam identifier based on the attribute information of the uplink information; and a transceiver configured to send the uplink information to a network side device based on the attribute information.

13. The terminal according to claim 12, wherein the at least one processor is further configured to:
obtain at least one measurement result by measuring at least one beamforming reference signal (BRS), wherein each of the at least one measurement result corresponds to at least one BRS.

14. The terminal according to claim 13, wherein the at least one processor is further configured to select a beam with a best measurement result from the at least one measurement result; and wherein the transceiver is further configured to report a beam identifier of the beam with the best measurement result.

15. The terminal according to claim 12, wherein the attribute information further comprises at least one of a value of the uplink information, resource information used when uplink information is sent, parameter information included in the uplink information, or format information included in the uplink information.

16. The terminal according to claim 12, wherein the processing module is configured to determine, based on a mapping relationship, the attribute information included in uplink information corresponding to the beam identifier, wherein the mapping relationship is configured by the network side device for the terminal, or the mapping relationship is obtained through a table query, or the mapping relationship is pre-agreed.

17. An apparatus, comprising:
a transceiver configured to:
receive uplink information from a terminal based on attribute information, wherein the attribute information is determined by the terminal based on a beam identifier, the uplink information comprises uplink control information, uplink control channel information, the attribute information comprises content information included in the uplink information, and the attribute information implicitly indicates the beam identifier, wherein the uplink control information includes Channel State Information (CSI); and
at least one processor, configured to determine the beam identifier based on the uplink information.

18. The apparatus according to claim 17, wherein the transceiver is configured to:
receive a beam identifier of a beam with a best measurement result.

19. The apparatus according to claim 17, wherein the attribute information further comprises at least one of a value of the uplink information, resource information used when uplink information is sent, parameter information included in the uplink information, or format information included in the uplink information.

20. The apparatus according to claim 17, wherein the transceiver is configured to:
receive the uplink information sent by the terminal based on a parameter indicated by the parameter information.

* * * * *

UNITED STATES PATENT AND TRADEMARK OFFICE
CERTIFICATE OF CORRECTION

PATENT NO. : 11,363,574 B2
APPLICATION NO. : 16/503906
DATED : June 14, 2022
INVENTOR(S) : Xingwei Zhang et al.

Page 1 of 1

It is certified that error appears in the above-identified patent and that said Letters Patent is hereby corrected as shown below:

On the Title Page

Item (30), in the Foreign Application Priority Data section, please delete "2017100113970.8" and insert --201710011397.8--.

In the Claims

In Claim 1, Column 16, Line 39, delete "(C SI)" and insert --(CSI)--.

In Claim 6, Column 17, Line 15, delete "(C SI)" and insert --(CSI)--.

Signed and Sealed this
Thirteenth Day of September, 2022

Katherine Kelly Vidal
*Director of the United States Patent and Trademark Office*